United States Patent [19]

Bailey

[11] 4,193,785
[45] Mar. 18, 1980

[54] GLASS SHEET BENDING MOLD APPARATUS

[75] Inventor: Harold A. Bailey, Genoa, Ohio

[73] Assignee: Libbey-Owens-Ford Company, Toledo, Ohio

[21] Appl. No.: 933,712

[22] Filed: Aug. 15, 1978

[51] Int. Cl.$^2$ .................................. C03B 23/02
[52] U.S. Cl. ................................. 65/285; 65/287
[58] Field of Search ............. 65/285, 287, 288 DIG. 4

[56] References Cited
U.S. PATENT DOCUMENTS 4,002,450   1/1977   Hamilton et al. ................... 65/288

Primary Examiner—Arthur D. Kellogg
Attorney, Agent, or Firm—Collins, Oberlin & Darr

[57] ABSTRACT

Apparatus for forming relatively sharp angled bends in a flat sheet of glass including a sectionalized gravity mold supported on a frame having electrically conducting means thereon including a plurality of bus bars mounted on one of the end members of the frame in spaced relation thereto for engagement by electrically conducting probes to deliver electric current to said electrically conducting means. A rigid, unitary, one-piece electrical insulator substantially coextensive with said frame end member is interposed between the bus bars and the frame end member to electrically insulate the latter from said bus bars.

8 Claims, 9 Drawing Figures

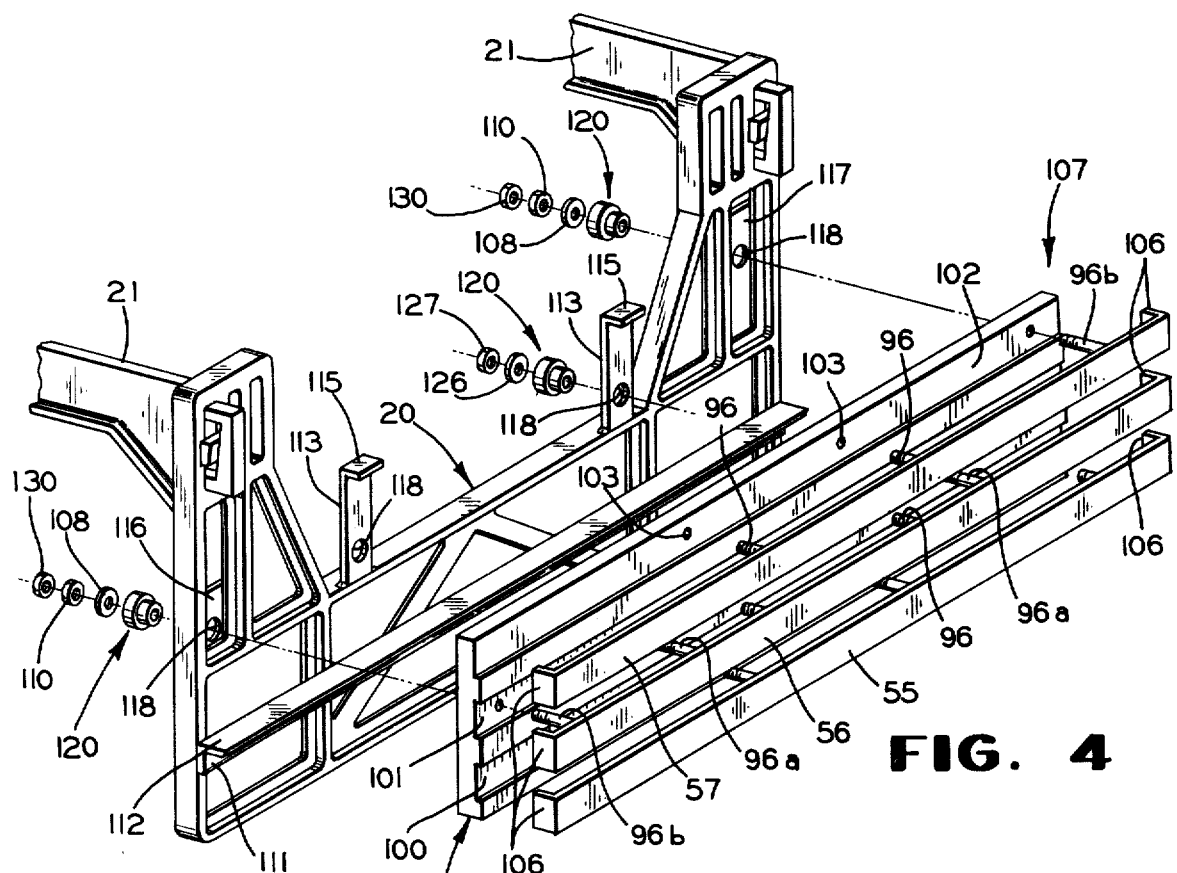
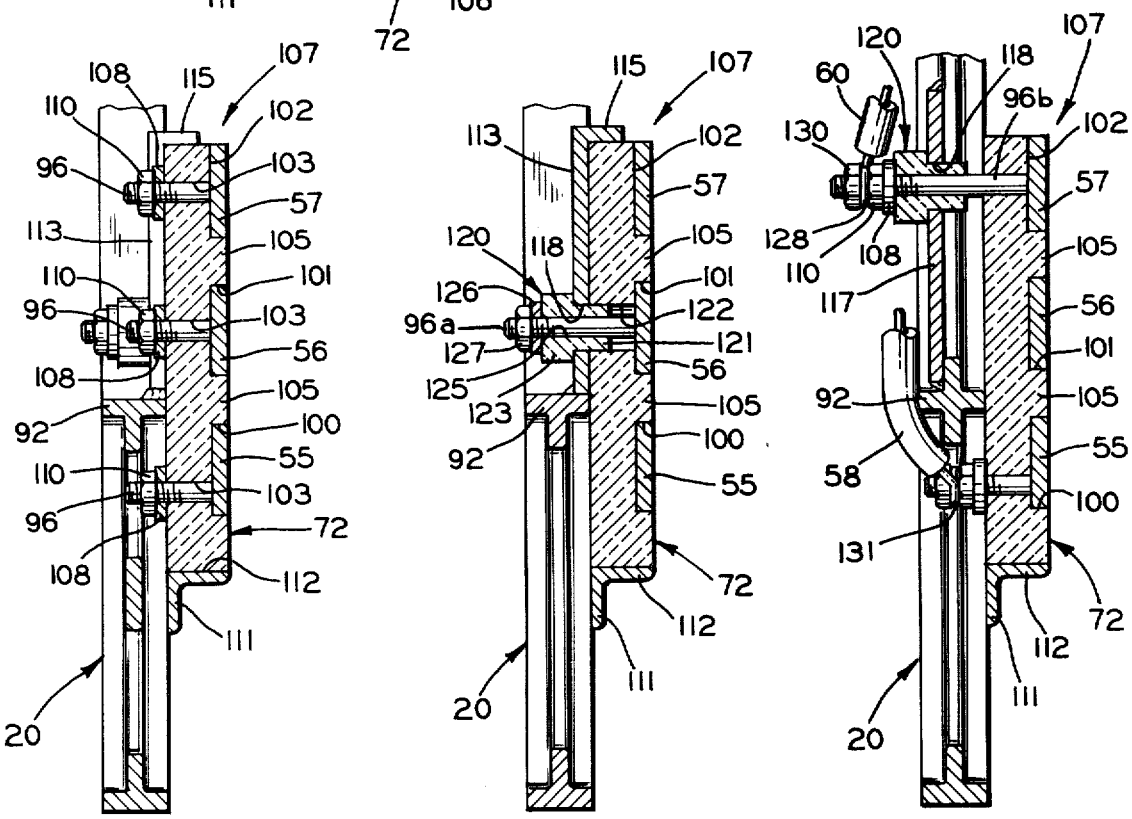
FIG. 4
FIG. 5  FIG. 6  FIG. 7

GLASS SHEET BENDING MOLD APPARATUS

BACKGROUND OF THE INVENTION

The present invention relates generally to the production of bent sheets or plates of glass and, more particularly, to an improved gravity mold apparatus for use in bending glass sheets to relatively sharp angles.

In some of the latest automotive designs, it has been found desirable to provide certain of the glazing closures, such as the backlights for example, with sharp bends to form a central panel portion extending continuously across the vehicle from one side to the other thereof, and integral end portions sharply bent inwardly relative to the central panel portion about generally vertical lines to extend longitudinally into the sides of the vehicle.

One successful technique developed for imparting such sharp bends to glass sheets is disclosed in U.S. Pat. Nos. 3,762,903 and 3,762,904, assigned to the same assignee as the present invention, whereby one or more electrically conducting paths are formed on at least one surface of the glass sheet along the line or lines about which it is desired to sharply bend the sheet. The sheet is then supported on a suitable gravity mold structure and heated in a furnace to a temperature corresponding to the softening point of the glass, causing it to sag by gravity into conformance with the shaping surfaces of the mold while simultaneously passing electric current through the electrically conducting path or paths to heat the area of the glass sheet immediately adjacent said paths to a temperature above the aforementioned softening point, causing the sheet to bend along such path or paths to form the desired relatively sharp bends therein.

In order to supply electric current to these paths, the molds are provided with electrically conducting means including bus bars adjacent one end thereof adapted to be engaged by electrically conducting probes projecting into the path of the bus bars as they advance with the mold through the furnace. More recently developed molds are provided with three bus bars mounted on the frame and which must be electrically insulated therefrom to preclude shorting-out of the circuitry. This has been accomplished in known molds by bolting each bus bar at a plurality of spaced points to the mold frame and providing individual insulators in the form of flanged bushings for each bolt fastener arrangement. While such known mold assemblies have served the purposes for which they were intended, they possess certain disadvantages. For example, when damaged, it is often necessary to remove the bus bars for repair and/or replacement or to gain access to other damaged mold components. Since the typical mold assembly is provided with 18 bolt connections for the three bus bars, removal and reassembly thereof becomes an arduous and time consuming task, adding materially to production costs. Also, because of the small mass and fragility of each insulator, they are easily chipped, fractured and even dislodged from the mold assembly, creating a potential electrical short out. Moreover, the bus bars are sometimes deflected inwardly between the spaced support points to interrupt the flow of electric current between the probes and bus bars.

SUMMARY OF THE INVENTION

Accordingly, it is a primary object of the present invention to obviate the above shortcomings by providing a new and improved electrical insulating arrangement for use in a gravity type mold utilized for forming glass sheets with relatively sharp angled bends.

It is another object of this invention to provide the foregoing mold structure with a simple and novel electrical insulating arrangement simplifying bus bar removal and replacement.

It is still another object of the present invention to provide a mold structure with a bus bar-insulator assembly which can be attached and removed, as a unit, to and from the associated mold support frame.

It is a further object of this invention to provide the foregoing mold structure with an enlarged, one-piece insulator board sandwiched between the bus bars and the mold support frame to minimize the number of insulator components required and which offers support for the bus bars throughout substantially their entire lengths while minimizing, if not entirely eliminating, electrical short-outs.

The foregoing and other objects, advantages, and characterizing features of the present invention will become clearly apparent from the ensuing detailed description of an illustrative embodiment thereof, taken together with the accompanying drawings wherein like reference characters denote like parts throughout the various views.

BRIEF DESCRIPTION OF THE DRAWINGS

FIG. 4 is a fragmentary, exploded, perspective view of one end of the mold assembly of FIG. 1;

FIG. 5 is a vertical sectional view, on an enlarged scale, taken along the line 5—5 of FIG. 2;

FIG. 6 is a vertical sectional view, on an enlarged scale, taken along the line 6—6 of FIG. 2;

FIG. 7 is a vertical sectional view, on an enlarged scale, taken along the line 7—7 of FIG. 2;

DESCRIPTION OF THE PREFERRED EMBODIMENT

Figure 1:
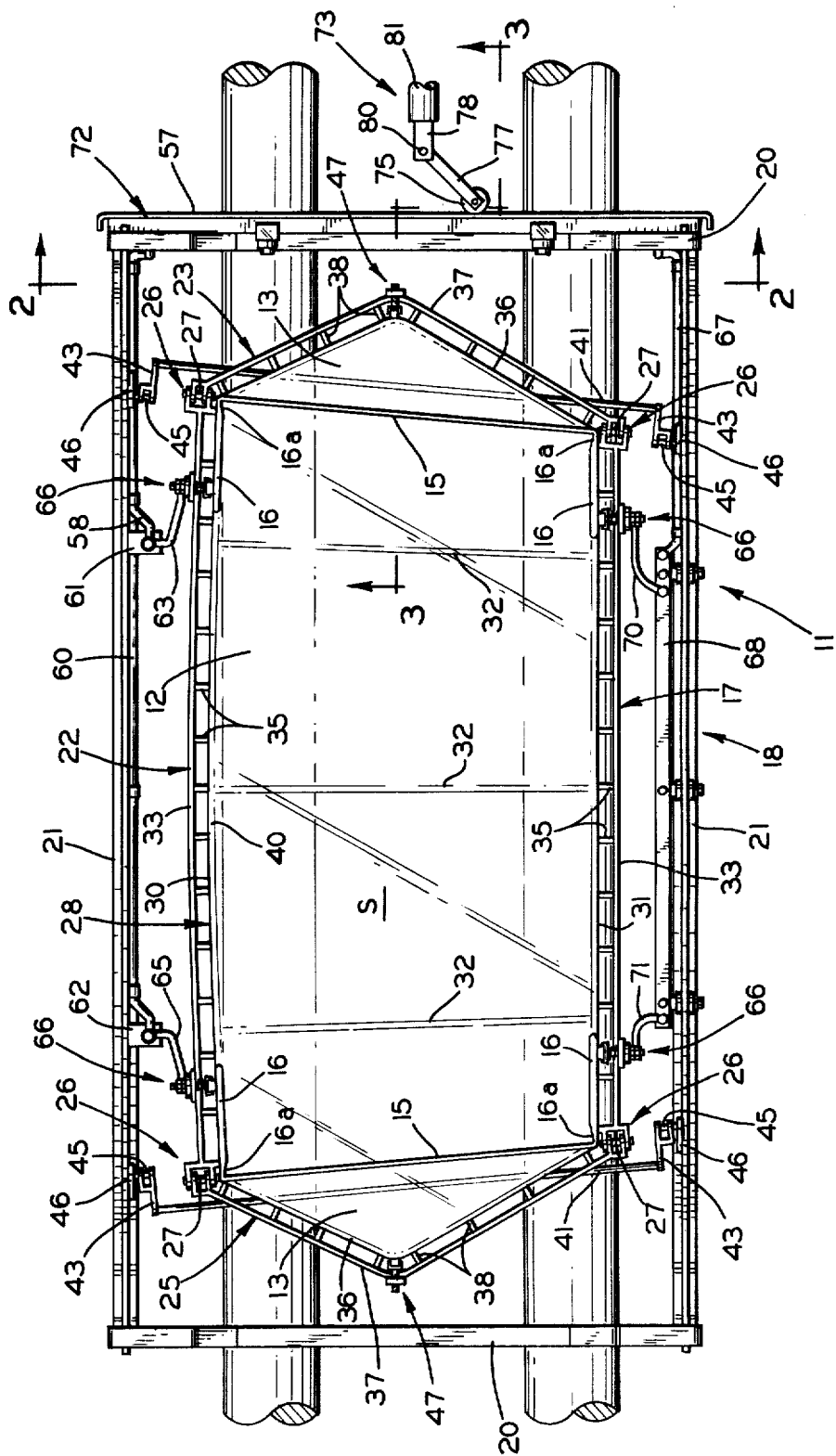
FIG. 1 is a top plan view of a gravity mold assembly shown in an open, glass receiving position and which incorporates novel features of the present invention.

Referring now in detail to the illustrative embodiment depicted in the accompanying drawings, there is shown in FIG. 1 a mold assembly, comprehensively designated 11, constructed in accordance with this invention, and shown in the open position for receiving a flat, monolithic sheet of glass S adapted to be sharply bent into a desired configuration. The flat sheet of glass S is formed with a central body or panel portion 12 and a pair of end portions 13 of generally triangular configurations in plan. The end portions 13 are adapted to be bent at sharp angles about straight line paths extending from one longitudinal edge of the sheet to the other to form an automotive backlight having inturned side portions compatible with recent automotive styling features. The paths or axes of the bends are defined by electrically conducting paths or frit lines 15 (FIG. 1) formed on the inboard surface of the sheet S prior to bending. Each frit line or electrically conducting path 15 is formed with at least one lateral extension 16 of any desired length at each opposite end of the path 15 and which extends along the longitudinal edge of the sheet. The purpose and function of the electrically conducting paths 15 and extensions 16 will be hereinafter described in detail. While it will be convenient to describe this invention in connection with a glazing closure formed of a single sheet with two transversely extending sharp angular bends therein, it should be appreciated that this invention is not limited thereto but envisages the production of glass sheets having any number of sharp angled bends in a transverse and/or longitudinal direction and/or multiple layered sheets of glass, such as conventional laminated windshields for example.

In a mass production operation for bending glass sheets to the desired shape, a series of mold assemblies are loaded onto a conveyor system which supports and conveys the glass laden mold assemblies in a continuous, substantially horizontal path through an elongated heating furnace having suitable heating means for heating the glass sheets to their softening point or bending temperature. The furnace also is equipped with electrical supply or conducting means to deliver electrical current to each sheet S via its associated mold assembly 11 during the advancement thereof through the furnace for imparting the desired sharp angular bends to the sheet in a manner that will hereinafter be described in detail. Since the conveyor system, the furnace, and the electrical supply or conducting means is well known, no illustration or further description thereof is believed necessary. Reference may be had to U.S. Pat. Nos. 4,002,450 and 4,015,969, assigned to the same assignee as the present invention, for a more detailed showing and description of such arrangements.

The mold assembly 11 employed to form the sharp angular bends in the finished glass product comprises a sectionalized, articulated, skeleton-type mold 17 mounted on a substantially rectangularly shaped support frame 18. This frame comprises a pair of upwardly extending end members 20 which are connected to each other at their upper ends by a pair of parallel, longitudinally extending mold supports 21 whose contour and elevation corresponds generally to the shape of the skeleton-type mold 17.

Figure 3:
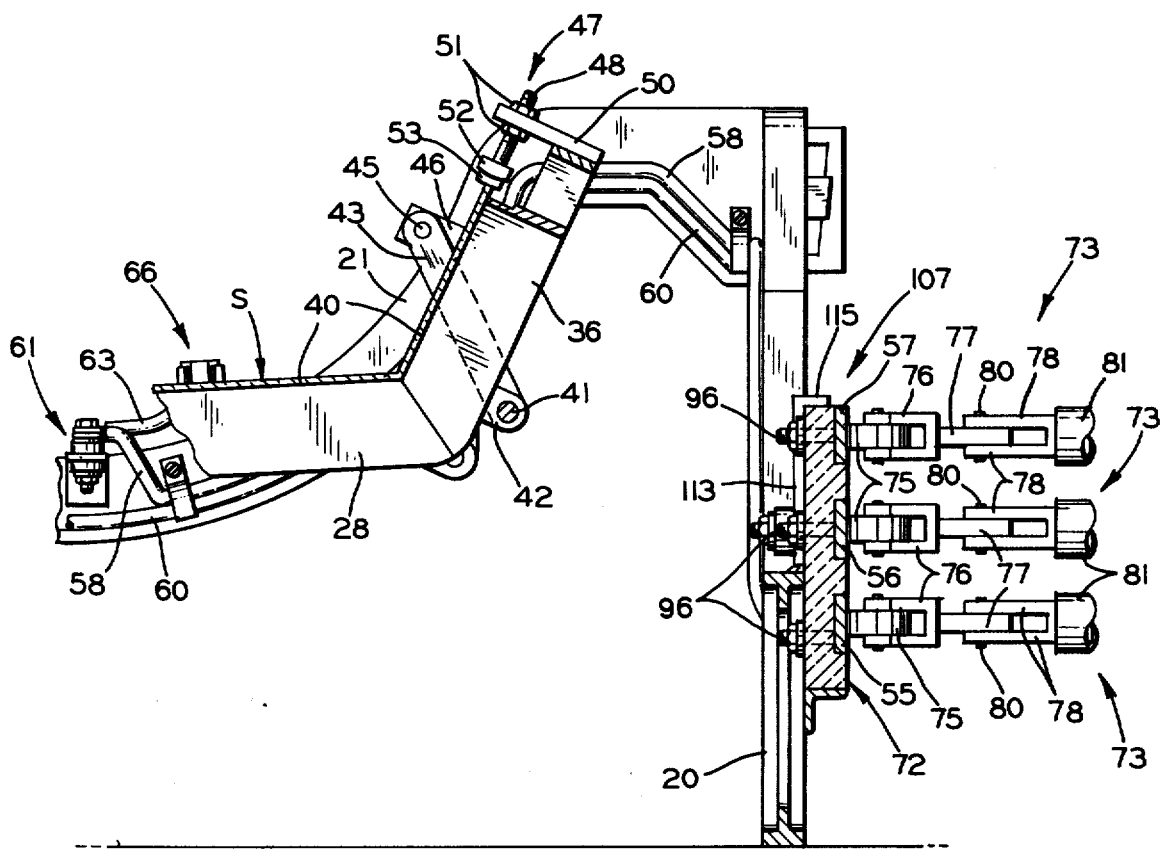
FIG. 3 is a partial longitudinal sectional view, on an enlarged scale, taken along the line 3—3 of FIG. 1, and showing the mold assembly in a closed position.

The mold 17 comprises a center section 22 and a pair of end sections 23 and 25 pivotally connected together at their adjacent ends by means of diametrically opposed hinge assemblies, generally designated 26, for pivotal movement between an open, glass receiving position shown in FIG. 1 and a closed, final position shown in FIG. 3. These hinges 26 can be conventional and it is believed that no further amplification or description thereof is necessary, it being noted that each pair of horizontally opposed hinges include horizontally aligned pivot pins 27 defining a common pivot axis about which the end sections 23 and 25 swing relative to the center section 22.

The mold center section 22 is provided with a shaping rail 28 comprised of laterally spaced elongated portions 30 and 31 connected together and maintained in a fixed, spaced relation by tie rods 32. The shaping rail 28 is carried by a mating support rail 33 comprised of opposed portions spaced slightly outwardly of shaping rail portions 30 and 31 and connected thereto by spacers 35.

The mold end sections 23 and 25 are substantially identical and mirror images of each other, and each comprises a shaping rail 36 of substantially V-shaped configuration in plan. Each shaping rail 36 is carried by a mating support rail 37 having the same general outline as its associated shaping rail 36, but slightly larger in peripheral dimension than the latter and connected in spaced relation thereto by spacers 38. The top surfaces of shaping rails 28 and 36 are substantially continuous and together form an angular shaping surface 40, when closed, conforming to the final shape of the glass sheet when bent as shown in FIG. 3. The shaping surface 40 in its entirety is spaced above the upper surfaces of the adjacent support rails 33 and 37. Of course, where only one sharp V-shaped bend is contemplated, the mold proper may be formed of only two sections hingedly connected together adjacent their inner ends rather than three pivotal sections as employed in the articulated mold shown and described in the illustrative embodiment of this invention.

To support the mold for movement from an open position, wherein the flat glass sheet to be bent is received, into the closed position of FIG. 3, a transversely extending pivot bar 41 is rigidly secured to each mold end section 23, 25 by means of lugs 42 (FIG. 3) depending downwardly from the associated support rail 37 and through which the bar 41 extends. The opposite ends of each bar 41 are rotatably supported by links 43, in turn pivotally carried by pins 45 secured to lugs 46 rigidly secured to the mold supports 21 of frame 18. The pivot bars 41 are normally adjusted and located off center of their associated mold sections 23, 25 to allow the mold to close due to their weights unless a force is applied to the outermost ends of such mold sections, causing the same to pivot about bars 41 to raise the inner ends of the sections.

Locator stops, generally designated 47, are mounted on support rails 37 at the apexes thereof for properly positioning the flat glass sheet S on the mold when in the open position. These opposed stops 47 on the mold end sections 23 and 25 exert pressure on the ends of the sheet while maintaining the same in proper relation to the mold during the bending thereof. As best shown in FIG. 3, each stop 47 comprises an elongated threaded rod 48 projecting through a support plate 50 affixed to the associated support rail and adjustably secured to such plate by means of lock nuts 51. A holder 52 is secured to the inner end of rod 48 for receiving a block 53 formed of any suitable heat-resistant material and which is engageable with the edge of the glass sheet.

As hereinbefore mentioned, one successful process for forming relatively sharp, angular bends in glass sheets involves the formation of electrically conductive paths on at least one surface of the glass sheet along the lines about which it is desired to sharply bend the sheets. Electric current is then passed through these paths to heat the same by resistance and thereby the glass sheet in the area immediately adjacent or beneath the paths, causing the preheated sheet to bend by gravity along the paths to form sharp angled, V-shaped bends. The mold assembly 11 herein disclosed is employed to carry out the above process in a mass production operation and incorporates electrical conducting means for delivering the necessary electric charge to the glass sheet to be bent.

While it is desirable to introduce electric current into the glass sheet at the opposite ends of the electrically conducting paths 15, obstructions and hardware located on the mold adjacent the end portions of such paths 15 often preclude this. Thus, the paths 15 are extended along the longitudinal edges thereof as by means of the hereinbefore mentioned extensions 16. It should be noted, however, that the width or cross sectional area of paths 15 are substantially less than that of the path extensions 16 to consequently provide a substantially greater resistance to current flow than the latter and thereby the generation of relatively greater heat to effect the bend along the desired line formed by paths 15. In order to prevent possible damage to the opposite ends of conducting paths 15 due to the drastic transition of the greater cross sectional area of path extensions 16 to the lesser cross sectional area of paths 15, the cross sectional areas of path extensions 16 are reduced, as shown at 16a in FIG. 1 for example, prior to the joining thereof with conducting paths 15.

The primary electrically conducting paths 15, as well as the path extensions 16, can be formed on each glass sheet S in accordance with the methods set forth in U.S. Pat. No. 3,762,903. If desired, a groove may be formed in one or both surfaces of the glass sheet along the lines about which it is desired to bend the sheet to facilitate the bending operation, as set forth in detail in U.S. Pat. No. 3,762,904, whereby the electrically conducting paths 15 would then be formed in such groove. While various materials may be used to form these electrically conducting paths and path extensions, preferred compositions are comprised of conductive metal pastes. These materials, sometimes also referred to as "inks", are applied to the glass sheet by conventional silk screen processes, painting, or other conventional uniform coating processes and then are heated or fired to fuse the material to the sheet.

Typically, the pastes comprise conductive metal particles, e.g., silver, glass frit particles and organic binders and salt. Although the conductive silver pastes are ideally suited for forming the electrically conducting paths 15 and path extensions 16, other conductive metal pastes may be used, e.g., those containing gold, paladium, platinum and alloys thereof. In addition, air drying dispersions of conductive metals may be employed. Also, materials such as electrically conducting tapes, which may or may not be removed after the bending step, can be employed.

As earlier mentioned, the mold assembly 11 of the present invention is especially adapted to carry out the above bending process in a mass production operation and embodies the necessary electrical conducting means for delivering the electrical charge to the glass sheet to be bent. The electrical conducting means on mold assembly 11 for delivering current from an electrical supply provided in the heating furnace to portions of the glass sheet in order to effect the desired relatively sharp angular bends therein includes three bus bars 55, 56 and 57 mounted on one of the end members 20 of support frame 18. A pair of conductive leads 58 and 60 connect bus bars 55 and 57 to a pair of longitudinally spaced terminals 61 and 62, respectively, suitably mounted on one of the mold supports 21. A pair of flexible conductor leads 63 and 65 electrically connect terminals 61 and 62 to a pair of contact assemblies, generally designated 66. A conductor lead 67 connects the central bus bar 56, which serves as a common ground, to an interior bus bar 68 suitably mounted within the support frame 18 in generally parallel, spaced relation to the opposite mold support 21. A pair of flexible conductor leads 70 and 71 electrically connect the bus bar 68 to a pair of contact assemblies 66.

The bus bars 55, 56 and 57 of support frame 18 are connected to one of the support frame end members 20 and extend transversely thereacross in spaced relation thereto by means of a novel insulator board 72, constructed in accordance with this invention, and suitably held in place as will hereinafter be explained. These bus bars 55-57 are adapted to be engaged by three electrically conducting probe assemblies, generally designated 73, connected to a suitable source of electrical power (not shown) by the electrical supply means forming a part of the heating furnace. As shown in FIGS. 1 and 3, each probe assembly 73 comprises a contact wheel 75 rotatably journalled in a yoke 76 affixed to the distal end of an arm 77 pivotally mounted between a pair of extensions 78 by means of a pivot pin 80. The extensions 78 are formed integral with a tube 81 suitably secured and received in a suitable opening formed in the furnace sidewall. Means (not shown) are provided for biasing the probe arms 77 into an extended position into the path of movement of bus bars 55-57 so as to be engaged thereby at a critical time during conveyance of the mold assembly 11 through the furnace.

Figure 8:
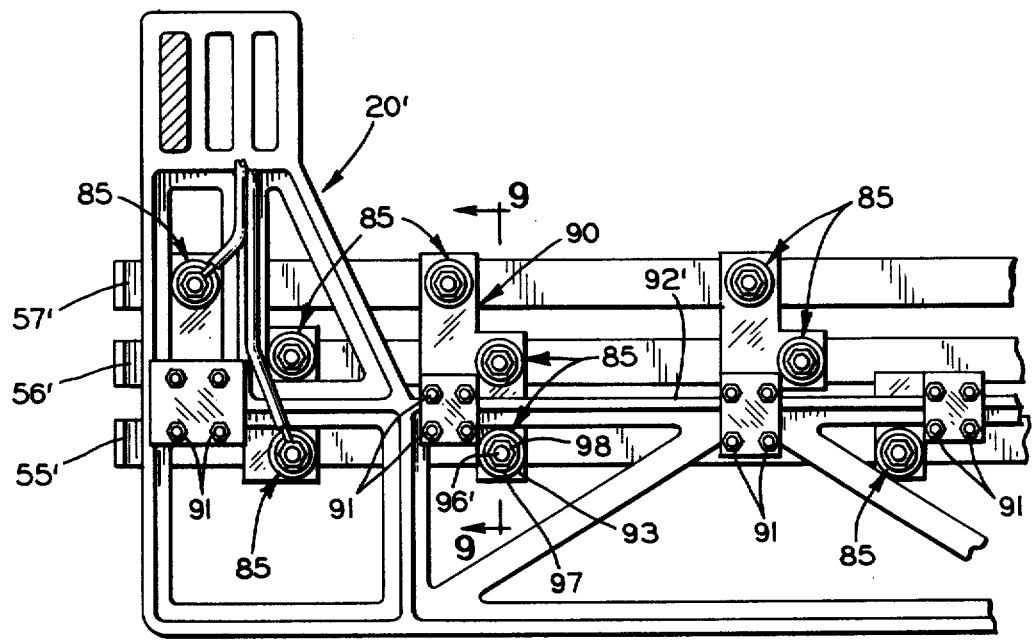
FIG. 8 is a fragmentary end elevational view of a prior art mold assembly equipped with a multiplicity of insulator bushings.
Figure 9:
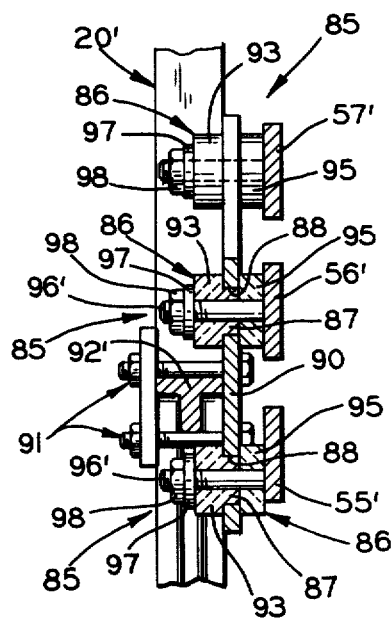
FIG. 9 is a vertical sectional view, on an enlarged scale, taken along the line 9—9 of FIG. 8.

In order to preclude electrical short-outs, the bus bars 55, 56 and 57 must be electrically insulated from the support frame 18, more specifically from the frame end member 20 to which they are attached. An important feature of the present invention resides in the mounting of these bus bars 55, 56 and 57 on the frame end member 20 and the mode of electrically insulating the former from the latter. In known mold assemblies employing three bus bars, such as shown in FIGS. 8 and 9, a multiplicity of fastening assemblies 85 are employed to secure the bus bars 55', 56' and 57' to the mold support frame 20' and various supports especially provided thereon, with each fastening assembly 85 requiring its own electrical insulator, generally designated 86. These components of the prior art mold assembly (FIGS. 8 and 9) that are common to the structure of mold assembly 11 of the present invention are identified by the same reference characters primed.

As best shown in FIG. 9, each insulator 86 of the prior art mold assembly is a composite, two-piece assembly formed of a suitable electrically insulating material and includes a bushing 87 received in a complementary opening 88 formed in a support bracket 90 secured, as by bolt and nut assemblies 91, to a T-shaped structural member 92' forming a part of the support frame end member 20'. The insulator bushing 87 is provided with an enlarged diameter flange 93 bearing against one face of the support bracket 90. The other insulator piece is in the form of a disc 95 abutting the other face of the support bracket 90. Bushing 87 and disc 95 are suitably bored for receiving the bolt 96' of fastening assembly 85 and which is rigidly secured to the rear face of its associated bus bar as an integral part thereof. A washer 97 is utilized at the threaded end of bolt 96' and a suitable nut 98 is threaded thereonto and tightened against the flange 93 of bushing 87, to secure the assembly in placed. Thus, the bus bars 55'-57' are electrically insulated from the mold support frame 18' at each fastening assembly 85.

While such an insulation arrangement serves the purposes for which it was designed, it is not entirely satisfactory because of certain disadvantages. For example, these mold assemblies are especially vulnerable to damage in operation because of the severe service conditions encountered during a production run, thus necessitating frequent repairs. Even though the bus bars are not damaged, they frequently must be removed in order to gain access to the damaged mold parts. Thus, all fastening assemblies 85, together with their associated insulators 86, must be disassembled and then reassembled after mold repair. Since there are at least 18 such assemblies 85 on the frame end member 20', it can be appreciated that this becomes a time-consuming, arduous task. Moreover, additional hardware inventory in the form of support brackets 90, bolts, nuts, washers and the like are required, adding materially to production and maintenance costs. Also, due to the fragility of the refractory material of which the insulators are formed and because of their relatively small mass, they are easily chipped, fractured, and often completely dislodged from the mold frame, creating the possibility of an electrical short-out. Furthermore, these fastening assemblies 85 offer support for the bus bars at spaced intervals only, thereby leaving the major portions of the bus bars unsupported and susceptible to inward deflection under the influence of the pressure biased probe assemblies 73. This, in turn, effects interruptions in the electrical current introduced to the glass sheet to create cold spots in the electrically conducting paths and abort the desired sharp bends intended to be imparted thereto.

The insulating arrangement incorporated in the mold assembly of the present invention overcomes the above noted shortcomings by providing an elongated one-piece insulator board 72 substantially coextensive with the frame end member 20 and bus bars 55–57 and interposed therebetween. Insulator board 72 is formed of a suitable electrical and thermal ceramic insulating material in a rigid, unitary, one-piece, self-supporting construction of generally rectangular configuration in elevation (FIG. 4). Preferably, the board is composed of a lightweight alumina and silica ceramic fiberboard, such as that marketed under the trademark "Fiberfrax" by the Carborundum Company, P.O. Box 333, Niagara Falls, N.Y. However, it should be understood that the invention is not in any way restricted to the use of "Fiberfrax" and any other suitable lightweight electrical and thermal insulating material having similar properties of high temperature durability, resistance to heat shock and flame erosion, and which has chemical stability and neutrality, can be used in lieu of "Fiberfrax", if desired.

Because of the unitary, one-piece construction and the large mass of the insulator board 72, there is little likelihood of sufficient damage thereto to initiate an electrical short-out between the bus bars 55–57 and the mold support frame 18. In the event of chipping of the insulator board 72 along its marginal edges, or of a portion thereof being crushed or broken away for example, as might possibly occur during a production run, a sufficiently large enough mass of the board 72 would remain to prevent displacement thereof relative to the support frame 18 to thereby maintain its integrity intact.

Figure 2:
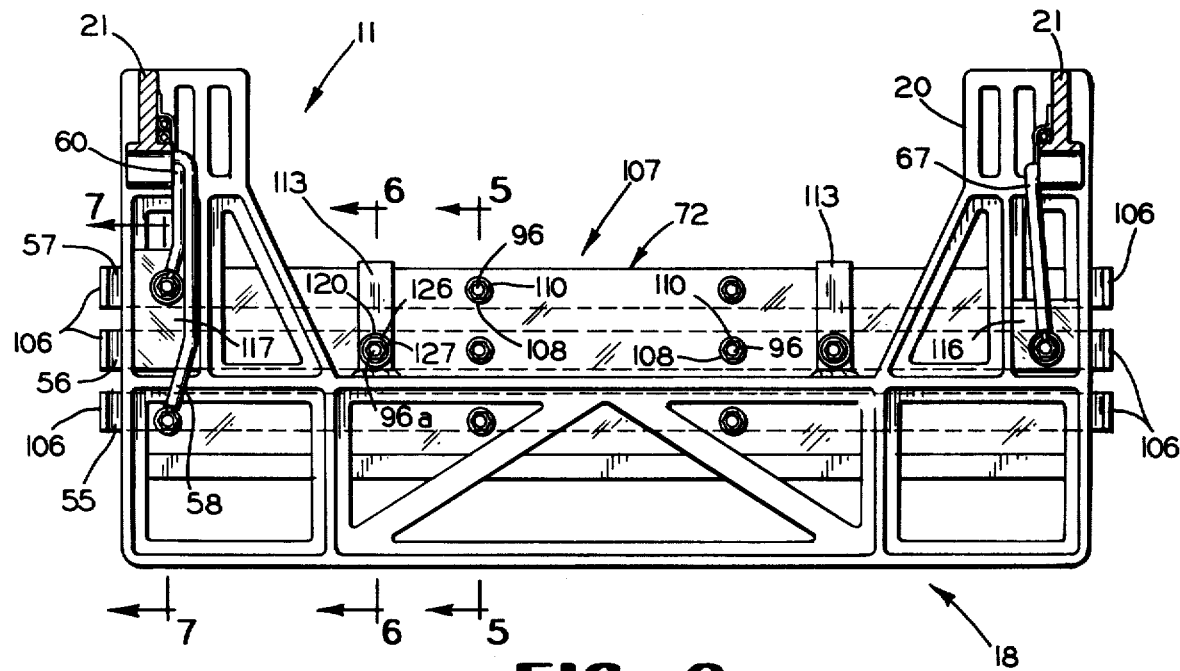
FIG. 2 is a vertical sectional view, on an enlarged scale, taken along the line 2—2 of FIG. 1.

The insulator board 72 is formed with three elongated channels 100, 101 and 102 to accommodate the bus bars 55, 56 and 57, respectively, and a series of openings 103 are formed in the several channels for receiving the bolts 96 attached to the bus bars. As best shown in FIGS. 5–7, the channels 100–102 are separated by land portions 105, the outer surfaces of which lie in a common plane with the outer surfaces of bus bars 55–57 when attached to board 72. Thus, the bus bars 55–57 are fully supported in their entireties throughout substantially their entire lengths, the end portions thereof terminating in inturned flanges 106 slightly spaced from the respective opposite ends of the board 72, as shown in FIGS. 1 and 2.

The majority of the bolts 96 that are attached to the bus bars 55–57 are utilized to mount the same on the insulator board 72 to form an assembly 107 that can be expediently detached and replaced as a unit. As best shown in FIG. 5, these bolts 96 are inserted through openings 103 and are provided with washers 108 bearing against the rear face of insulator board 72 and nuts 110 for securing the bus bars 55–57 to insulator board 72.

The simplified means for supporting and mounting the insulator board-bus bar assembly 107 on support frame end member 20 includes an elongated angle member 111 welded or otherwise fixedly secured to end member 20 and coextensive therewith and having a horizontal leg 112 which serves as a support ledge for the bottom edge of board 72. A pair of spaced support brackets 113 are rigidly secured at their lower ends to structural T-bar 92 of the end member 20 and are provided at their upper ends with horizontally extending lips 115 overlying and engageble against the upper edge of board 72. These brackets 113, as well as two end support brackets 116 and 117 forming a part of end member 20, are formed with openings 118 for receiving fastening elements as will presently appear. Thus, the insulator board 72 as a part of assembly 107, is secured to the support frame at four points only, drastically simplifying the mounting thereof as compared to known mold assemblies provided with electrical conducting components.

At the two intermediate mounting locations, the fastening arrangement includes a one-piece bushing 120 (FIG. 6) composed of a suitable electrical and thermal insulating material. The bushing 120 comprises a shank portion 121 inserted through the bracket opening 118 and enlarged diameter opening 122 formed in the board 72 and a head portion 123 engageable against the rear face of the associated bracket 113. The bushing 120 is provided with a through opening 125 for accommodating bolt 96$a$, which is slightly longer than the previously mentioned bolt 96. A suitable washer 126 and nut 127 are tightened onto the threaded end of bolt 96$a$ for releasably securing the bus bar-insulator assembly 107 to support frame end member 20 while electrically insulating bus bars 55–57 therefrom.

The fastening means at end mounting location 116 differs somewhat from that described above in that the shank of bushing 120 is spaced from insulator board 72 and the bolt, identified as 96$b$ (FIG. 7), is somewhat longer than bolts 96 and 96$a$ to accommodate such spacing and for receiving the contact 128 of conductor lead 60, which is secured in place by nut 130. A similar fastening and insulating arrangement is provided at the other end mounting location 117 to accommodate the ground conductor lead 67. The contact 131 of the lower conductor lead 58 at mounting location 116 is simply mounted on bolt 96 and does not require the insulator bushing 120 since there is no contact with any of the metallic components of the support frame 18. Thus, whenever necessary to remove the bus bars 55–57 for gaining access to other mold components, it is only necessary to detach the leads 58, 60 and 67 and then remove four nuts securing the bus bar-insulator board assembly 107 to the support end member 20, thereby significantly expediting mold assembly repair and maintenance.

From the foregoing, it is apparent that the objects of the present invention have been fully accomplished. As a result of this invention, an improved insulator of unitary, one-piece construction is provided for more efficiently electrically insulating a plurality of bus bars from the mold support frame of a gravity type mold having electrically conducting means thereon. Because of the integrity, strength, durability and the large mass of the insulator board, the possibilities of electrical short-outs due to the structural failure thereof is virtually eliminated. The improved insulator board of this invention offers support for the bus bars throughout substantially their entireties to preclude deflection or distortion thereof, thereby assuring continuous electrical contact between the bus bars and the electrically conducting probes engageable therewith throughout the entire lengths of the bus bars. The bus bars are connected to the insulator board to form an assembly which can be attached and removed, as a unit, to and from the associated mold support frame to facilitate mold repair and maintenance.

It is to be understood that the form of the invention herewith shown and described is to be taken as an illustrative embodiment only of the same, and that various changes in shape, size and arrangement of parts may be resorted to without departing from the spirit of the invention.

I claim:

1. Apparatus for bending a glass sheet to a relatively sharp angle by passing electric current through an electrically conducting path formed on the sheet to generate heat along said path and bend the sheet therealong comprising: a frame having opposite end members, an outline type bending mold supported on said frame and having a substantially continuous shaping surface formed thereon and conforming to the margin of the glass sheet to be bent, electrically conducting means including a plurality of bus bars mounted on one of said frame end members in spaced relation thereto for engagement by electrically conducting probes, and a unitary, one-piece electrical insulating member substantially coextensive with said one end member and interposed between said one end member and said bus bars for electrically insulating the latter from said frame, said insulating member engageable with said bus bars along substantially the entire lengths thereof to provide support against inward deflection of said bus bars.

2. Apparatus according to claim 1, including means for removably attaching said bus bars to said electrical insulating member to form an assembly adapted for attachment and removal as a unit to and from said one end member.

3. Apparatus according to claim 2, including means removably mounting said assembly to said one end member at a few spaced points only.

4. Apparatus according to claim 1, wherein said electrical insulating member is composed of a lightweight, heat and flame resistant, thermal and electrical insulating material.

5. Apparatus according to claim 4, wherein said material is composed of an alumina and silica ceramic fiberboard.

6. Apparatus according to claim 1, wherein said electrical insulating member is of generally rectangular shape in elevational plan and formed with spaced elongated channels and land-defining surfaces therebetween, said elongated channels receiving said bus bars, respectively, so that the outer surfaces of said bus bars are substantially flush with said land-defining surfaces.

7. Apparatus according to claim 1, wherein said electrical insulating member is composed of an alumina and silica ceramic fiberboard of generally rectangular shape in elevational plan, said member formed with spaced elongated channels and land-defining surfaces therebetween, said elongated channels receiving said bus bars, respectively, so that the outer surfaces of said bus bars are substantially flush with said land-defining surfaces and the inner surfaces of said bus bars are maintained in contact with indented flat surfaces defined by said channels throughout substantially the entire lengths of said bus bars.

8. Apparatus according to claim 7, including means for removably attaching said bus bars to said electrical insulating member to form an assembly adapted for attachment and removal as a unit to and from said one end member, and means removably mounting said assembly to said one end member at four spaced locations only.

* * * * *